(12) United States Patent
Kondratiuk et al.

(10) Patent No.: US 12,528,270 B2
(45) Date of Patent: Jan. 20, 2026

(54) METHOD OF PRODUCING A LAMINATED METAL SHEET FOR PACKAGING APPLICATIONS AND LAMINATED METAL SHEET FOR PACKAGING APPLICATIONS PRODUCED THEREBY

(71) Applicant: TATA STEEL IJMUIDEN B.V., Velsen-Noord (NL)

(72) Inventors: Dmitry Kondratiuk, Haarlem (NL); Jan Paul Penning, 's-Gravenhage (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 472 days.

(21) Appl. No.: 17/904,521

(22) PCT Filed: Mar. 8, 2021

(86) PCT No.: PCT/EP2021/055781
§ 371 (c)(1),
(2) Date: Aug. 18, 2022

(87) PCT Pub. No.: WO2021/180651
PCT Pub. Date: Sep. 16, 2021

(65) Prior Publication Data
US 2023/0082644 A1    Mar. 16, 2023

(30) Foreign Application Priority Data
Mar. 9, 2020   (EP) ..................... 20161925

(51) Int. Cl.
*B32B 15/09*   (2006.01)
*B32B 15/085*   (2006.01)
(Continued)

(52) U.S. Cl.
CPC ............ *B32B 15/09* (2013.01); *B32B 15/085* (2013.01); *B32B 15/18* (2013.01); *B32B 27/08* (2013.01);
(Continued)

(58) Field of Classification Search
None
See application file for complete search history.

(56) References Cited

U.S. PATENT DOCUMENTS

| 5,330,605 A | 7/1994 | Tanaka et al. |
| 5,753,328 A | 5/1998 | Miyazawa et al. |

(Continued)

FOREIGN PATENT DOCUMENTS

| EP | 0312304 A | 4/1989 |
| JP | 2002-160721 A * | 6/2002 |

(Continued)

OTHER PUBLICATIONS

Written Opinion and International Search Report for PCT/EP2021/055781 filed Mar. 8, 2021.

(Continued)

*Primary Examiner* — Vivian Chen
(74) *Attorney, Agent, or Firm* — Vorys, Sater, Seymour and Pease LLP; Anthony P. Venturino; Maryellen Feehery Hank (57) ABSTRACT

A method of producing a laminated metal sheet for packaging applications and laminated metal sheet for packaging applications produced thereby.

20 Claims, 7 Drawing Sheets

(51) Int. Cl.
  *B32B 15/18* (2006.01)
  *B32B 27/08* (2006.01)
  *B32B 27/32* (2006.01)
  *B32B 27/36* (2006.01)
  *B32B 37/04* (2006.01)
  *B32B 37/16* (2006.01)
  *B32B 37/20* (2006.01)
  *B32B 38/00* (2006.01)

(52) U.S. Cl.
  CPC .............. *B32B 27/32* (2013.01); *B32B 27/36* (2013.01); *B32B 37/203* (2013.01); *B32B 38/0004* (2013.01); *B32B 38/0036* (2013.01); *B32B 37/04* (2013.01); *B32B 37/16* (2013.01); *B32B 37/20* (2013.01); *B32B 2038/0028* (2013.01); *B32B 2270/00* (2013.01); *B32B 2307/40* (2013.01); *B32B 2307/514* (2013.01); *B32B 2307/516* (2013.01); *B32B 2307/518* (2013.01); *B32B 2307/54* (2013.01); *B32B 2307/704* (2013.01); *B32B 2311/30* (2013.01); *B32B 2323/00* (2013.01); *B32B 2367/00* (2013.01); *B32B 2439/66* (2013.01)

(56) References Cited

U.S. PATENT DOCUMENTS

| | | | |
|---|---|---|---|
| 9,346,254 | B2 | 5/2016 | Penning et al. |
| 10,899,111 | B2* | 1/2021 | Penning .................. B32B 15/09 |
| 11,752,748 | B2* | 9/2023 | Pattiasina ............... B32B 27/36 |
| | | | 428/458 |
| 12,042,959 | B2* | 7/2024 | Kondratiuk ............. B32B 15/08 |
| 2004/0198907 | A1* | 10/2004 | Ohishi .................. B32B 15/082 |
| | | | 525/64 |
| 2009/0145898 | A1* | 6/2009 | Takatsu ...................... C08J 5/18 |
| | | | 428/458 |
| 2014/0072742 | A1* | 3/2014 | Penning ............. B32B 38/0012 |
| | | | 428/35.8 |
| 2016/0025709 | A1 | 1/2016 | Costes et al. |
| 2016/0257099 | A1* | 9/2016 | Yamanaka ............... B65D 1/12 |
| 2018/0104930 | A1* | 4/2018 | Lin ..................... B32B 38/0036 |
| 2018/0354248 | A1* | 12/2018 | Penning .................. B32B 27/36 |
| 2019/0091969 | A1* | 3/2019 | Penning .................... B32B 7/12 |
| 2021/0039370 | A1* | 2/2021 | Pattiasina ........... B29C 48/0018 |
| 2021/0237420 | A1* | 8/2021 | Tijssen .................... B32B 15/18 |
| 2022/0212444 | A1* | 7/2022 | Itoh ........................ C08L 67/02 |
| 2023/0023925 | A1* | 1/2023 | Penning ............... C25D 7/0614 |

FOREIGN PATENT DOCUMENTS

| | | |
|---|---|---|
| JP | 2003127307 A | 5/2003 |
| JP | 2011008170 A | 1/2011 |
| WO | 9730841 A1 | 8/1997 |
| WO | 2017102143 A1 | 6/2017 |
| WO | 2019110616 A1 | 6/2019 |

OTHER PUBLICATIONS

Technical Note, AN-922, W.M. Doyle, Axiom Analytical, 2001.
TCCT, Tata Steel, URL:<https://products.tatasteelnederland.com/brands/packaging/tcct>, retrieved from the Internet Dec. 6, 2024.
Mitchell, et al., Evaluation of preferred orientation in multi-component polymer systems using X-ray scattering procedures, Chapter in Progress in Colloid & Polymer Science, Jan. 1970, DOI: 10.1007/b107341, URL: <Ts-620evaluation20of20preferred20orientation20in20multi-component20polymer20systems20using20x-ray20scattering20procedures.pdf>, retrieved from the Internet Dec. 6, 2024.
Heintz, et al., Observing molecular orientation in isotactic polypropylene films with polarized Raman spectroscopy, ThermoFischer Scientific, 2022, URL:<https://assets.thermofisher.com/TFS-Assets/CAD/Application-Notes/AN52791-E%200116M%20DXR%20Polarization.pdf>, retrieved from the Internet Dec. 6, 2024.
OPUS Spectroscopy Software Version 6, User Manual, IDENT, Brucker, Chapter 6 (2006).

* cited by examiner

METHOD OF PRODUCING A LAMINATED METAL SHEET FOR PACKAGING APPLICATIONS AND LAMINATED METAL SHEET FOR PACKAGING APPLICATIONS PRODUCED THEREBY

FIELD OF THE INVENTION

This invention relates to a method of producing a laminated metal sheet for packaging applications and laminated metal sheet for packaging applications produced thereby.

BACKGROUND OF THE INVENTION

Laminated metal sheet for packaging comprises a metal sheet and a laminate layer that covers at least one side of the metal sheet. Such a laminated metal sheet is produced by laminating the laminate layer onto the metal sheet. If the laminate layer at least partly comprises polyester, then the laminate layer is applied to the metal sheet by i). heat bonding the laminate layer to the metal sheet or ii). by using an adhesion promoter between the laminate layer and the metal sheet or iii). by using a laminate layer comprising an adhesion layer. The laminate layer may be produced in-line and laminated onto the metal sheet in an integrated lamination step, or a pre-produced laminate layer may be laminated onto the metal sheet in a separate lamination process step The way the laminate layer is produced, prior to laminating it onto the metal sheet, means that most if not all of it is produced by stretching a thick cast film into a thin laminate layer often followed by annealing (heat setting) stage to avoid shrinkage of the laminate layer during the lamination onto the metal sheet. In most stretched laminate layers, the polymer molecules are either biaxially oriented or uniaxially oriented, depending on whether the film was biaxially stretched or uniaxially stretched. Heat setting is particularly important if the laminate layer was stretched in the transverse direction.

The most commonly used laminate layer is biaxially stretched (or biaxially oriented (BO)) where the laminate layers have a similar degree of orientation in the machine direction (MD) and in a direction perpendicular to the machine direction (cross- or transverse direction (TD)). Examples of BO-laminate layers based on semi-crystalline polyesters such as polyethylene terephthalate (PET) and polybutylene terephthalate (PBT) and their blends laminated on steel substrates are disclosed in EP0312304. In most cases the BO laminate layers are stretched in the machine direction (MD) and in the transverse direction to the same extent. This generally leads to a material with a more in-plane uniformity of orientation of the polymer chains.

An alternative type of stretching of laminate layer is uniaxial stretching as disclosed in U.S. Pat. No. 9,346,254B2. A metal substrate is provided on one or both sides with a machine direction oriented (MDO) laminate layer. Without heat setting this uniaxial stretching results in laminate layers which retain a strong orientation of the polymer chains in the direction of stretching. The laminate layer may also be uniaxially stretched in the transverse direction (TDO) leading to a strong orientation of the polymer chains in the transverse direction. In both the MDO and the TDO laminate layers the properties of the laminate layer in both in-plane directions (MD and TD) are different.

A disadvantage when using MDO laminate layers without heat-setting is that the stability in terms of wrinkling and shrinking of the MDO laminate layer during lamination is less than the stability of a heat-set uniaxially or BO-laminate layer. On the other hand, a heat-set laminate layer is more expensive and they are only available as pre-prepared films. The integration of the lamination process with the laminate layer production is therefore not practical in that case. Equipment for producing heat-set BO-laminate layers based on polyesters such as PET and PBT and their blends furthermore requires a large capital expenditure and is inflexible toward changes in the laminate composition or recipe.

Heat bonding of the laminate layer onto a heated metal sheet reduces or eliminates the residual orientation through re-melting of laminate layer, at least at the surface of the metal substrate. It is known that if the residual orientation is not reduced sufficiently then the formability, corrosion resistance and the appearance of the laminated metal sheet is inadequate. Assessing the residual orientation of the laminate layer on the laminated metal sheet is therefore of prime importance to guarantee a good quality laminated metal sheet to customers.

The usual procedures to check residual orientation in the laminate layer include tensile strength measurements (WO1997030841), birefringence (U.S. Pat. No. 5,753,328) and wide-angle X-ray Scattering (WAXS) (JP2011008170), which are only suitable for analysis of the laminate layer after it has been removed from the metal sheet onto which it had been laminated by dissolving the metal sheet.

Thus, these methods are not suitable for the analysis of the laminated metal sheet as a product. In addition, birefringence is only suitable for assessing transparent films due to the sensitivity of birefringence to the size of polymer crystallites which can lead to issues with reproducibility. Polarized Raman spectroscopy can be used for the assessment of semi-crystalline polymers on laminated metal sheets (US20160257099). However, employing polarized Raman light for semi-crystalline polymers is only suitable for the quality control of transparent (non-pigmented) polymer films/coatings due to scattering issues (Technical Note AN-922, 2001, W. M. Doyle, Axiom Analytical). Furthermore, these methods are very time-consuming and take several days or even weeks to complete, and involve significant efforts for sample preparation. These durations and preparations are not compatible with continuous production lines because the result of the assessment will only be known long after completion of the production process of the laminated metal sheet. Thus, a quick reaction in case of identification of undesired residual orientation is not possible, potentially leading to considerable amounts of rejected materials.

Objectives of the Invention

It is an object of this invention to provide a method for producing a laminated metal sheet with a controlled low or absent residual orientation in the laminate layer.

It also an object to provide a method to produce a laminated metal sheet with a low or absent residual orientation in the laminate layer and with a reduced amount of rejected material.

It is also an object to provide a method to determine the degree of residual orientation quickly to reduce the amount of rejected material.

It is also an object of the invention to provide a laminated metal sheet with a low degree of orientation.

DESCRIPTION OF THE INVENTION

In a first aspect of the invention one or more of the objects is reached by a method for producing a laminated metal sheet (9) for packaging applications, the laminated metal sheet comprising a metal sheet (1) and a laminate layer (3a) that covers at least one side of the metal sheet, wherein the laminate layer (3a) contains a single layer containing 50% by mass or more of polyester, or a plurality of layers (3a',3a",3a''') each containing 50% by mass or more of polyester, wherein the laminate layer (3a) prior to being laminated onto the metal sheet (1) has a preferred molecular orientation in one direction and wherein an Euclidean distance matrix D between a first and a second ATR-FTIR spectrum of the laminate layer (3a) has a value of at least 0.20 (i.e. 0.20 or higher), and wherein the laminate after lamination onto the metal sheet has a value of D between the first and the second ATR-FTIR spectrum of the laminate layer (3a) of 0.10 or lower, and wherein the first spectrum is measured in an ATR-FTIR spectrometer with the incident IR-beam parallel or perpendicular to the machine direction of the laminated metal sheet and wherein the second spectrum is measured in the spectrometer after rotating the laminated metal sheet over an angle alpha in the plane of the laminate layer selected between 7° and 110°, and wherein the ATR-FTIR spectra are measured in the spectral range which includes the range of 1160 to 1520 cm$^{-1}$.

WO2017102143 discloses a process for laminating a polyester film onto a major surface of a metal strip in a coating line wherein the emphasis lies on preventing creasing and wrinkling of the polyester film during lamination by selecting an appropriate combination of film tension, line speed and yield stress of the polyester film. WO2019110616 discloses a process for producing polymer coated steel sheet for 3-piece cans by laminating a plurality of narrow polymer strips onto tinplate.

Both WO2017102143 and WO2019110616 disclose the use of a post-heating step after lamination intended to achieve a low-crystalline or amorphous polymer film after lamination but neither discloses a method to determine the level of crystallinity quickly. Only time consuming off-line methods such as X-ray diffraction, density measurements and DSC-methods are mentioned in general terms.

As the Euclidean distance matrix D between the first and the second ATR-FTIR spectrum depends on the choice of the angle alpha, the angle alpha must be selected in the claimed range and the same angle must be used when comparing the first and the second ATR-FTIR spectrum of the laminate layer in order to obtain comparable and unambiguous results.

The machine direction (MD) of the laminated metal sheet is identical to the rolling direction (RD) of the metal sheet and to the direction of movement of the metal sheet in the lamination process.

Preferably the first spectrum is measured with the orientation in the machine direction and the second spectrum after a rotation over an angle selected between 70 to 110°. Alternatively, the first spectrum is measured with the orientation perpendicular to the machine direction and the second spectrum after a rotation over an angle selected between 70 to 110°.

A value for D of zero means that the first and the second spectrum coincide in the observed range region and that there is no difference in orientation in the polymer coating in the two directions. A value of D>0 indicated the presence of residual orientation in the laminate layer. The acceptable level of D of at most 0.10 (i.e. 0.10 pr lower) is determined based on reference samples. With a value of D of 0.20 there is a significant difference between the two spectra which means that the orientation of the polymer chains of the laminate layer differs in the two directions. At values of D of at least 0.30 or even 0.40 the difference becomes ever more pronounced, and hence the difference in degree of orientation is more pronounced as well.

The invention is applicable for cases where the laminate layer before lamination onto the metal sheet has a distinct difference in orientation in the rolling direction and the transverse direction (TD). If the orientation in both directions is the same before lamination, then D is likely to be low before lamination. This is the case for biaxially oriented laminate layers that have been stretched in the RD and TD to the same extent, and for extruded laminate layers that are laminated directly upon the metal without intermediate solidification and stretching.

The invention is particularly applicable for the case where the laminate layer is stretched only in the machine direction, or only in the transverse direction.

The invention is embodied in a method for producing a laminated metal sheet in a continuous coating line, the method comprising the subsequent steps of:
  providing a metal sheet;
  providing a laminate layer (3a) for coating onto at least one side of the metal sheet with a Euclidean distance matrix D between a first and a second ATR FTIR spectrum of the laminate layer (3a) of 0.20 or higher;
  laminating the laminate layer (3a) onto the metal sheet (1) to produce a laminated metal sheet (9);
  post-heating the laminated metal sheet (9) to a temperature sufficiently high to melt the laminate layer (3a);
  cooling, preferably fast cooling, the post-heated laminated metal sheet (9) to produce a laminated metal sheet (9) with an Euclidean distance matrix D between a first and a second ATR FTIR spectrum of the laminate layer (3a) in the range of 0.10 or lower.

In a preferable embodiment the laminate layer for coating onto the metal sheet consists of one or more layers and is provided by:
  melting thermoplastic polymer granules in one or more extruders to form the one or more layers;
  forming the thermoplastic polymer film consisting of the two or more layers by passing the molten polymer or polymers through a flat (co-) extrusion die and/or two or more calendering rolls;
optionally followed by:
  cooling the thermoplastic polymer film to form a solid thermoplastic polymer film;
  optionally trimming the edges of the thermoplastic polymer film;
  reducing the thickness of the solid thermoplastic polymer film by stretching the solid polymer film in a stretching unit by exerting a stretching force only in the longitudinal direction;
  optionally trimming the edges of the stretched thermoplastic polymer film.

In an embodiment the method according to the invention is used to adjust the process parameters of a continuous coating line, such as one or both of the post-heat set-point (T2) and the line speed (v) of the continuous coating line is adjusted if the Euclidean distance matrix D of the laminate layer after post-heating and cooling is above 0.10. As soon as the D exceeds this threshold value, the degree of orientation is too large and the product is likely to underperform, which may lead to rejection or declassification of the material to a lower value product. The speed of the method according to the invention in comparison to the prior art techniques ensures that the amount of rejects can be reduced considerably.

In an embodiment the metal sheet is a steel sheet, preferably wherein the steel is uncoated cold-rolled steel, tinplate, ECCS (aka TFS), TCCT, galvanised steel or aluminised steel, and preferably the thermoplastic polymer film is a single layer or multilayer polyester or polyolefin polymer film.

In an embodiment the one or more thermoplastic polymer film or films are biaxially oriented polymer films.

In an embodiment the one or more thermoplastic polymer film or films are uniaxially oriented polymer films.

In a preferable embodiment the laminate layer is laminated onto the metal sheet to produce a laminated metal sheet without interruption in a continuous lamination process.

The method for at-line monitoring of residual orientation in the polymer coating of the laminated metal sheet obtained by lamination of uniaxially or biaxially oriented polyester-based film comprises the following steps:
   a. Obtaining a sample of the laminated metal sheet;
   b. Placing the sample on the ATR detector of the ATR-FTIR spectrometer so that the rolling direction of laminated metal sheet is parallel to a plane of incidence of infrared light from spectrometer infrared light source onto the ATR crystal;
   c. Recording the reflectance profile at least over the frequency range 1160-1520 $cm^{-1}$;
   d. Generating, using Fourier transformation, a first ATR-FTIR spectrum of the sample in this frequency range;
   e. Rotating the sample of a laminated metal sheet in the plane perpendicular to the sample surface normal over an angle alpha selected between 7° and 110° and repeating step c and d to produce a second ATR-FTIR spectrum;
   f. Mathematically comparing the correlation between the first and the second spectrum at least in the 1160-1520 $cm^{-1}$ frequency range by calculating the spectral distance as expressed in a Euclidean distance matrix D between the two spectra.

A value for D of zero means that the first and the second spectrum coincide in the observed range region and that there is no difference in orientation in the polymer coating in the two directions. A value of D>0 indicated the presence of residual orientation in the laminate layer. The acceptable level of D of at most 0.10 is determined based on reference samples. With a value of D of 0.20 there is a significant difference between the two spectra which means that the orientation of the polymer chains of the laminate layer differs in the two directions.

In attenuated total reflection infrared spectroscopy (ATR-FTIR) a material with a lower refractive index (the sample) is brought into contact with a higher refractive index material, such as a germanium or diamond crystal. The mid-infrared light that is irradiated through the higher refractive index material is totally reflected at the interface between the two materials. The reflected IR light is then collected by IR detector and mathematically processed by a Fourier transformation resulting in an ATR-FTIR spectrum. The ATR-FTIR spectrum contains strong characteristic and reproducible bands that can be directly assigned to specific chemical compositions (for example, using FTIR library databases) and thus provide information about the chemical composition of the material surface layer (typically 1-2 μm). IR light before entering the sample is at least partially polarized (either using additional polarizer or simply after passing through higher refractive index material). Because of the polarization of IR light, its interaction with molecular dipoles of polymers depends on the orientation of the polymer molecules. If there is a residual orientation in the laminate layer, then the spectrum is dependent on the angle between ATR crystal and the sample. When the sample has no residual orientation, ATR-FTIR spectra appear independent from the angle between the ATR crystal and the sample.

Several of the limitations in measuring residual orientation in the prior art are overcome by irradiating laminated metal sheet with partially polarized infrared light followed by collecting and analysing reflected infrared light such as in case of attenuated total reflectance Fourier transformed infrared spectrometer (ATR-FTIR). This method makes use of dichroic IR bands in the ATR-FTIR spectrum of one of the components used as orientation marker. The band intensities of dichroic IR bands are highly dependent on the orientation of the polymer chains with respect to the incident polarized infrared light. By comparing intensities of dichroic IR bands in, for example, two directions of the laminated metal sheet with respect to IR detector, the degree of orientation can be estimated. For isotropic laminate layer the band intensities of dichroic IR bands will be the same at all positions of laminated metal sheet sample with respect to IR detector. Typically, intensities of the dichroic IR bands are normalized to the intensity of some non-dichroic IR band to compensate for sample surface defects etc. In case of polymer coatings containing polyethylene terephthalate (PET) and blends thereof, the degree of orientation is usually estimated by following intensities of dichroic peaks assigned to trans-(1340 $cm^{-1}$, JP2003127307) or gauche-(1043 $cm^{-1}$, JP2002160721) form of $CH_2$ moiety of PET which are then normalized to non-dichroic IR band at 1410 $cm^{-1}$ (in-plane bending vibration of PET benzene rings). The limitation of this approach is that it estimates overall surface orientation of the semi-crystalline polymer blend based on the behaviour of just one component (orientation marker), in that case PET, rather than the polyester blend overall. In addition, this method is highly dependent on the presence of well resolved dichroic IR bands which is not always the case as in many cases IR bands are a superposition of several individual bands. As such, analysis of each new blend of polyester may require completely different dichroic IR bands if they are based not on PET or contain very little PET. Simple analysis of dichroic IR band intensities also neglects the changes in the shape or spectral position of dichroic IR bands for differently positioned samples with respect to ATR-FTIR spectrometer.

These problems are overcome by the method according to the invention, by irradiating and collecting partially reflected polarized infrared light such as in case of Attenuated Total Reflectance Fourier transformed infrared spectrometer (ATR FTIR).

The inventors found that the orientation in the semi-crystalline blends laminated on metal sheet can be determined by comparing two ATR-FTIR spectra in a specific frequency range encompassing, but not necessarily limited to, the 1160 to 1520 $cm^{-1}$ range measured in two different directions of a laminated metal sheet sample rotated over a set angle with respect to the normal of the sample.

The preferable frequency range is 1160 to 1520 $cm^{-1}$. The angle of rotation alpha between the two directions of the sample is preferably about 90. The advantage of such a method of estimating residual orientation based on measuring two ATR-FTIR spectra is that it can be performed on a wide range of blends of PET- and/or PBT based polyesters, co-polyesters and blends. This approach provides similar information as the birefringence measurement, but with advantage of being able to perform the measurement also on a laminated metal sheet independent of the size of the polymer crystallites. In addition, this approach considers not only changes in intensities of IR bands for differently positioned polymer coated samples, but also the effect of the position of samples on the shape or spectral position (shifting) of various IR bands.

The laminated metal sheet according to the invention may be provided with a laminate layer on one or on both sides of the metal sheet. In the latter case the laminate layers (3a,3b in FIG. 1) may be identical in terms of composition, thickness or build-up, or they may be different.

In an embodiment the laminated metal sheet according to the invention has a Euclidean distance matrix D between the two ATR-FTIR spectra of the laminate layer in the range of 0.00 to 0.07. The smaller the value of D the smaller the difference between the two spectra, and thus the smaller the degree of orientation in the laminate layer. In a preferable embodiment the Euclidean distance matrix D between the two ATR-FTIR spectra of the laminate layer is in a range of 0.00 to 0.05, and even more preferably D is at most 0.03.

The laminate layer according to the invention is a thermoplastic single/multi-layer semi-crystalline oriented film comprising at least 50% of polyester. Preferably the laminate layer comprises a semi-crystalline polyester or blend of polyesters, particularly those based on PET, $PET_g$, IPA-PET, CHDM-PET and PBT (in any ratio). It is preferred that the total amount of polyester in the laminate layer is at least 60% or more. Preferably the amount is at least 70%, more preferably at least 80%, even more preferably at least 90 or even at least 95%.

The metal sheet is selected from the group of metal sheets such as cold rolled steel, blackplate, tinplate, ECCS, TCCT®, galvanised steel or aluminium or aluminium alloy. The metal sheet is preferably supplied in coiled form. The laminated metal sheet is preferably also supplied in coiled form, although it can also be supplied to customers in the form of metal sheets or blanks.

In an embodiment the laminate layer is applied at least to the side of the metal sheet that becomes the inside of a packaging, such as a container or can, and the polyester in the laminate layer contains at least 70% by mole of an ethylene terephthalate unit. Preferably the laminate layer contains at least 80 or even 85% by mole of an ethylene terephthalate unit.

In an embodiment the laminate layer is applied at least to the side of the metal sheet that becomes the inside of a packaging that becomes the inside of a packaging, such as a container or can, and the polyester in the laminate layer contains at least 85% by mole of a butylene terephthalate unit.

In an embodiment the laminate layer is applied at least to the side of the metal sheet that becomes the inside of a packaging that becomes the inside of a packaging, such as a container or can, and the polyester in the laminate layer contains a blend of a polyethylene terephthalate (PET) and polybutylene terephthalate (PBT), preferably wherein the ratio of PET to PBT is 60:40 or higher. Preferably the ratio is 70:30.

In an embodiment the laminate layer is applied at least to the side of the metal sheet that becomes the inside of a packaging that becomes the inside of a packaging, such as a container or can, and the polyester in the laminate layer contains at least 85% by mole of an blend of a polyester containing 85% by mole of an ethylene terephthalate unit and a polyester containing at least 85% by mole of a butylene terephthalate unit.

According to a second aspect of the invention a laminated metal sheet for packaging applications according to the invention is provided.

Examples

To illustrate present invention, laminated metal sheets were produced. In all cases a metal sheet is provided on both sides with a thermoplastic polymer laminate layer. The metal sheet was a low carbon cold-rolled packaging steel commonly referred to as Electrolytically Chromium Coated Steel ("ECCS"), which is electrolytically coated on both sides with metallic chromium and a layer of chromium oxide where a total amount of chromium on each side is approximately 90 $mg/m^2$.

The polyester films in table 1 were used to produce the comparative and test samples.

TABLE 1

| | | | Laminate layers. | | |
|---|---|---|---|---|---|
| Code | t (μm) | Orient. Draw ratio | Adhesion layer | Main Layer | Top Layer |
| PET 1 | 20 (1/3/1) | MDO 1:4 | 70% PETg 30% IPA-PET | 100% IPA-PET | 100% IPA-PET |
| PET 2 | 20 | Biax 1:4 | Highly crystalline PET film commercially available as Hostaphan ® RHSL20 (Mitsubishi Polyester Film GmbH) | | |
| PET 3 | 15 (1/3/1) | MDO 1:4 | 25% PBT 75% IPA-PET | 25% PBT 75% IPA-PET | 25% PBT 75% IPA-PET |
| PET 4 | 18 (1/3/1) | MDO 1:4 | 100% IPA-PET | 67% IPA-PET 33% TiO2 MB | 100% IPA-PET |
| PET 5 | 15 (1/8/1) | MDO 1:3 | 100% PBT | 100% PBT | 100% PBT |
| PET 6 | 15 | Biax 1:4 | Highly crystalline PET film commercially available as Hostaphan ® RHSL15 (Mitsubishi Polyester Film GmbH) | | |

PETg = Eastman Eastar 6763, IPA-PET = Indorama Ramapet N180, $TiO_2$ MB = Sukano TA 76-98 MB03), PBT = Sabic Innovative Plastics Valox 315).

Figure 1:
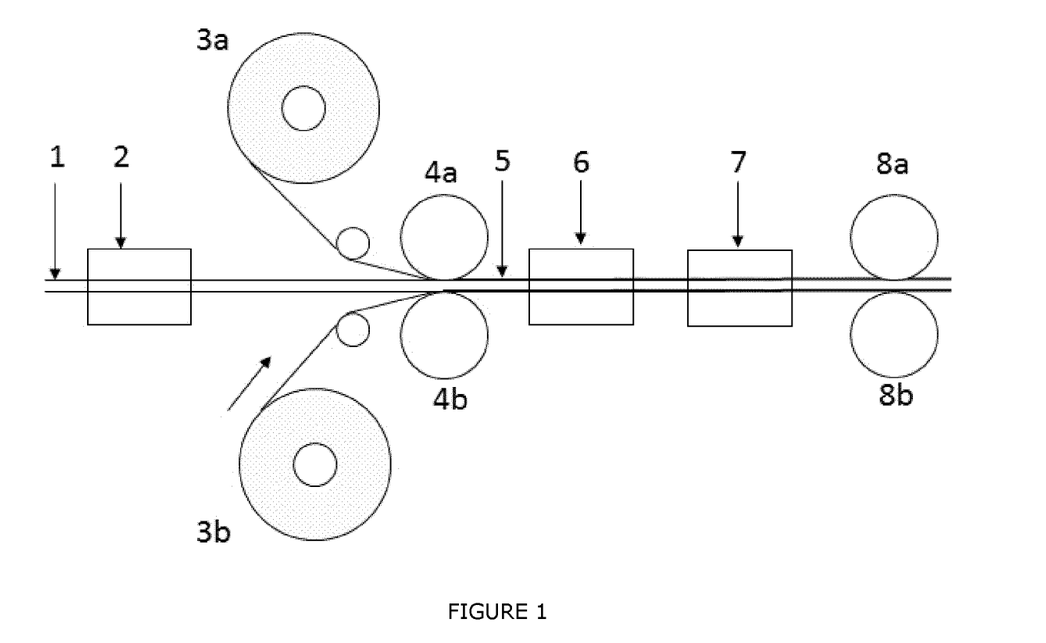
FIG. 1 shows a schematic drawing of an industrial continuous coating line.

The films PET1 through PET6 were laminated to the ECCS strip by a heat bonding process schematically shown in FIG. 1. The metal strip (1) is passed through a first heating device (2) where the temperature of the metal strip is raised to a preheat temperature suitable for lamination, T1. Coils of film (3a, 3b) are simultaneously unwound and passed, together with the pre-heated metal strip, through a pair of laminating rollers (4a, 4b). The laminated product (5) is passed through a second heating device (6) where the temperature of the laminated strip is raised to the post-heat temperature, T2. After the second heating device, the laminated product is immediately cooled by passing through a quenching device (7) to reach room temperature. The method of pre-heating the metal strip in the first heating device is not particularly limited and may include passing the strip over heated rolls, conductive heating, inductive heating, radiative heating, etc. The method of post-heating the laminated product in the second heating device is preferably a contactless method, such as heating in a hot gas environment or inductive heating. The method of immediate cooling in the quenching device is not particularly limited and may include applying cold air or passing through a cold-water bath etc. The laminated product is then passed through drying rollers (8a, 8b), after which samples are collected for acquisition of ATR-FTIR profile on the samples.

Table 2 specifies comparative ("CS") and test samples ("TS") produced to demonstrate applicability of the described ATR-FTIR methodology for measurement of residual orientation for a wide range of polyester film compositions. Table 2 also specifies the corresponding process conditions used to obtain those samples. In case of TS3 samples, corresponding comparative samples with no or low post-heat temperature could not be produced due to delamination during the process, and the TS3 data were compared with those obtained on PET5 film before lamination.

TABLE 2

Process conditions used to produce comparative and inventive samples

| Sample | Film type (top) | Film type (bottom) | Line speed (m/min) | T1 (° C.) | T2 (° C.) |
|---|---|---|---|---|---|
| TS1 | PET1 | PET2 | 50 | 200 | 260 |
| CS1 | PET1 | PET2 | 50 | 200 | 200 |
| TS2 | PET3 | PET4 | 80 | 220 | 270 |
| CS2 | PET3 | PET4 | 80 | 220 | No post-heat |
| TS3 | PET5 | PET6 | 35 | 225 | 275 |

After production of the samples, ATR-FTIR spectra were recorded and spectral distances D derived for sides where MDO films (PET1, PET3, PET4, PET5) were involved. Based on the obtained spectral distance D, the metal-laminate material was classified as good or bad quality as explained below. The results of classification obtained by ATR-FTIR on polymer-coated metal strip were then compared with results of product performance testing (for samples of polymer-coated metal strip) and DSC and tensile strength measurements on PET5 film or free-standing laminate films (after metal removal with hydrochloric acid).

Samples of laminated metal sheet were cut as 7.5×7.5 cm panels. ATR-FTIR spectra were recorded using a Bruker Tensor II ATR-FTIR spectrometer equipped with diamond crystal with a fixed predetermined incident angle of 45°. The ATR-FTIR signal was recorded using 16 scans at 1160-1520 cm$^{-1}$ with a 0.4 cm$^{-1}$ resolution. Prior to recording the actual ATR-FTIR spectra, the background signal was recorded. In case of TS3 samples which was compared to data on PET5 film (because corresponding not well post-heated films were not produced), ATR-FTIR spectra were recorded using Thermo Scientific Nicolet 650 iS10 ATR-FTIR spectrometer, equipped with a ZnSe crystal with a fixed predetermined incident angle of 42°. In that case, 8 scans were collected, also with 0.4 cm$^{-1}$ resolution.

For each sample, two spectra were recorded: Spectrum 1 was recorded with the sample rolling direction (which is identical to the machine direction (MD) of the continuous coating line) perpendicular to a plane of incidence of infrared light from spectrometer infrared light source onto ATR crystal, and Spectrum 2 was recorded after rotating the metal laminate sample by 90° in plane of the sample.

Mathematical comparison of Spectra 1 and Spectra 2 was achieved by calculating spectral distance D after vector normalization (to compensate for the difference in intensities due to surface defects) in the spectral range of 1160 to 1520 cm$^{-1}$. Calculated spectral distance D is a Euclidean distance matrix between the two spectra. The calculated Euclidean distance matrix can fall in the range from 0 (complete match of spectra) to 2 (complete mismatch of spectra). As a threshold, D=0.10 was identified by comparing results of known good and bad samples.

Figure 2:
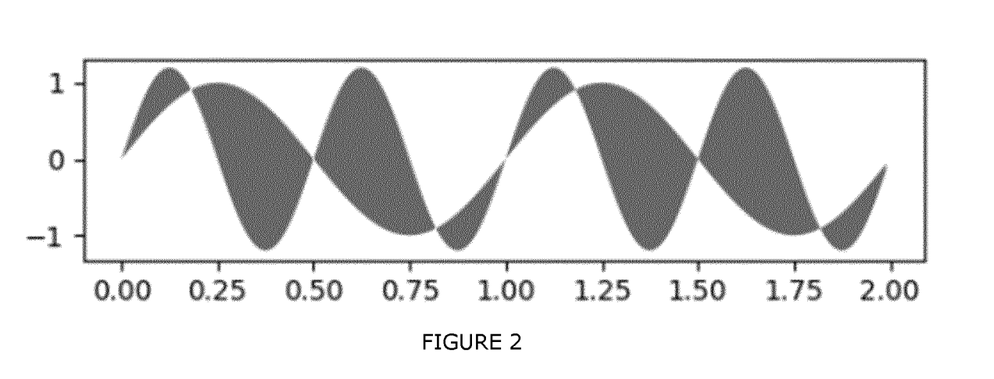
FIG. 2 shows a schematic drawing of the distance between two spectra.
Figure 3:
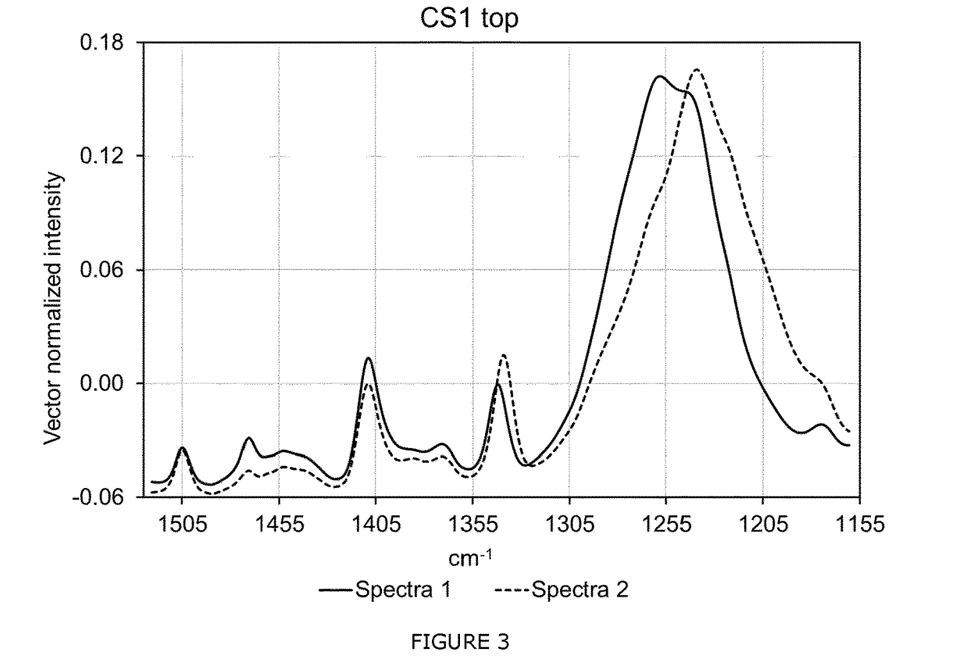
FIG. 3 Spectra with a bad sample for CS1—top.
Figure 4:
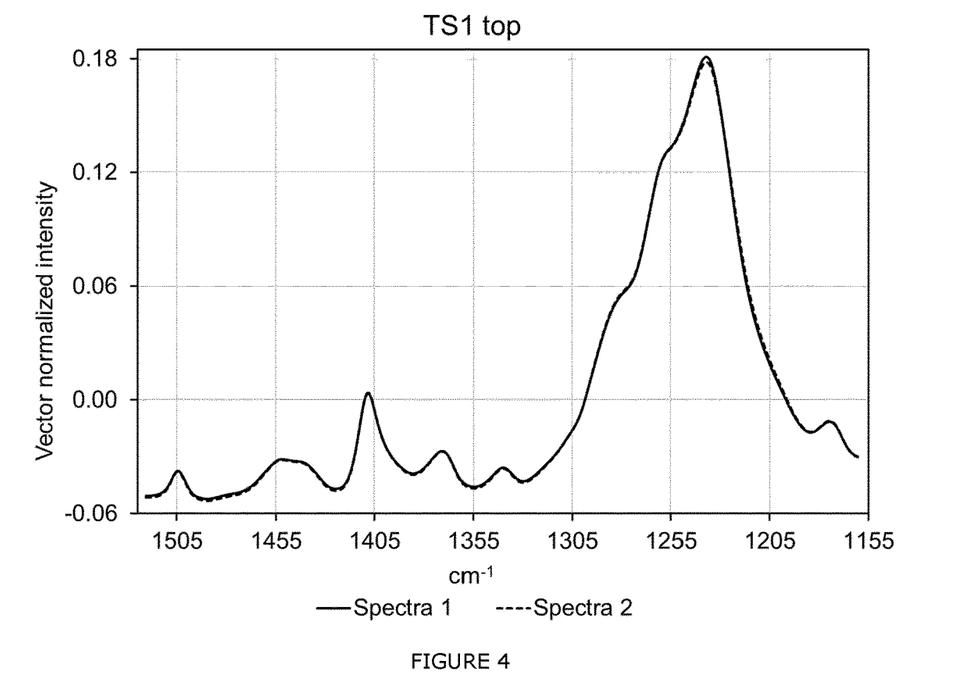
FIG. 4 Spectra with a good sample for TS1—top.
Figure 5:
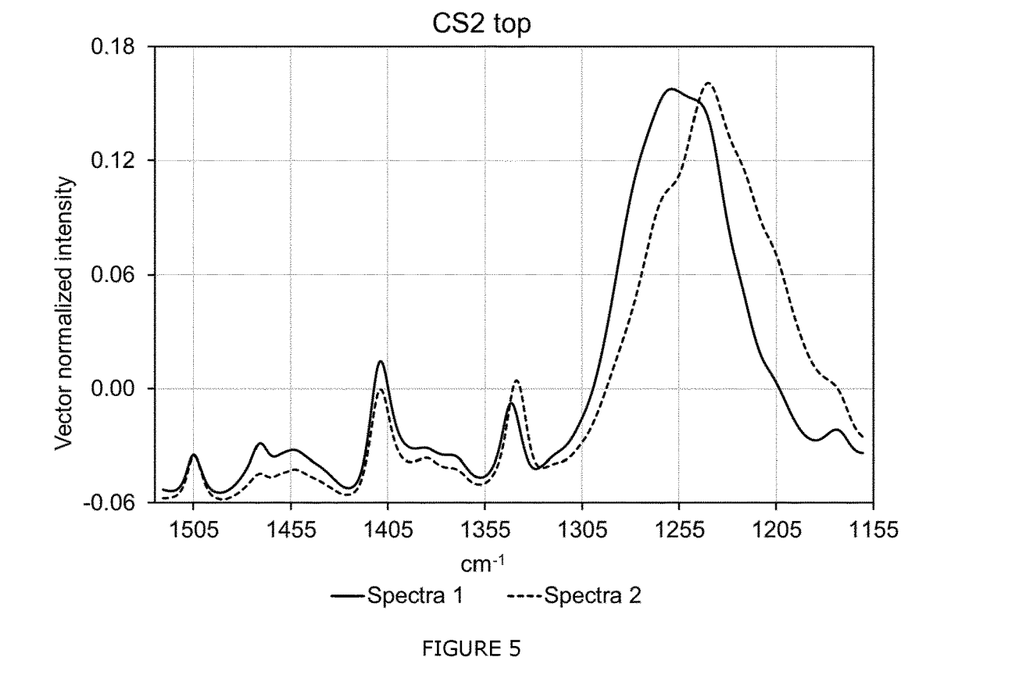
FIG. 5 Spectra with a bad sample for CS2—top.
Figure 6:
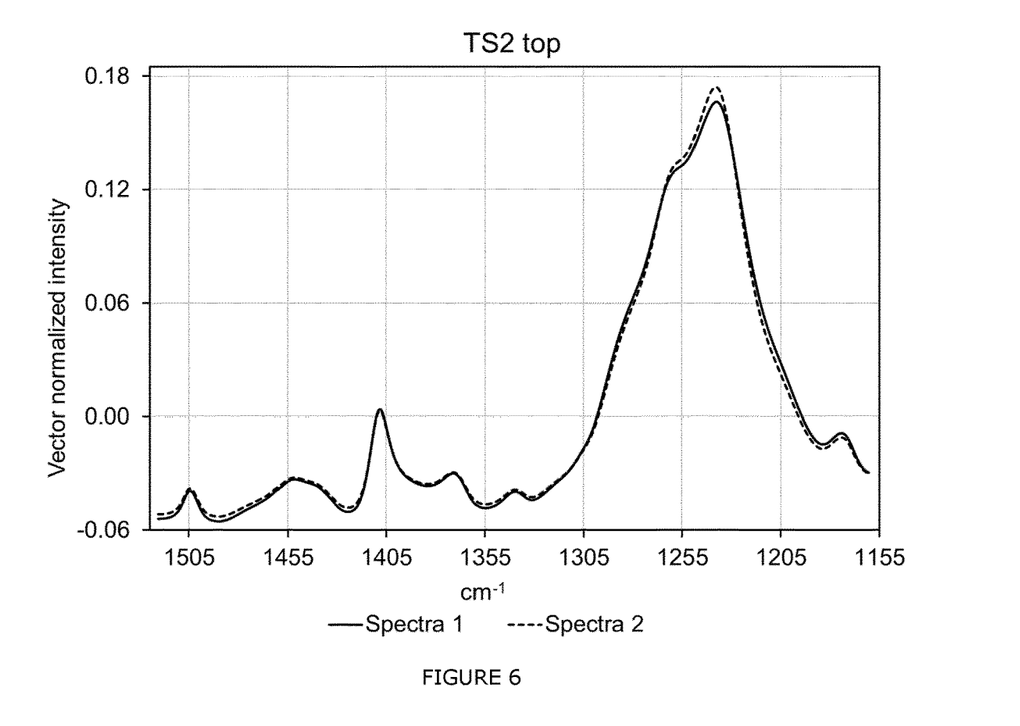
FIG. 6 Spectra with a good sample for TS2—top.
Figure 7:
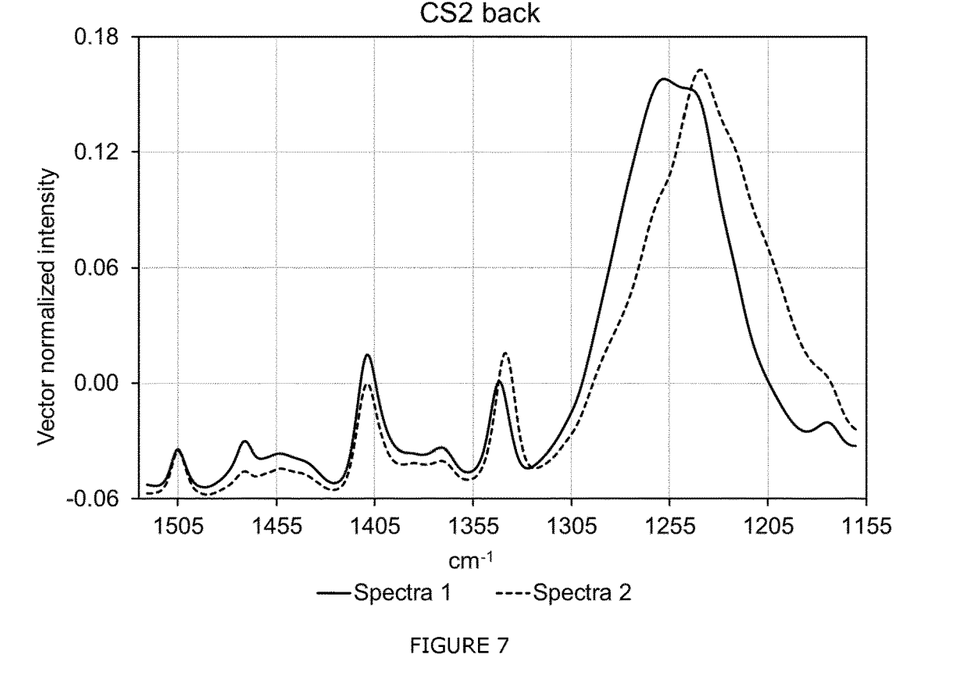
FIG. 7 Spectra with a bad sample for CS2—bottom.
Figure 8:
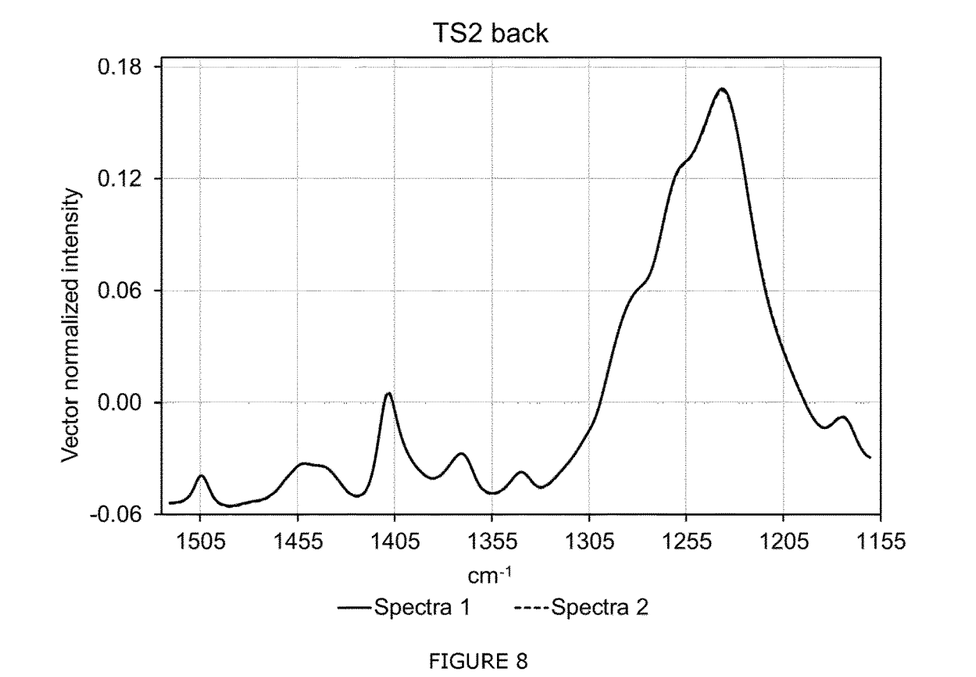
FIG. 8 Spectra with a good sample for TS2—bottom.
Figure 9:
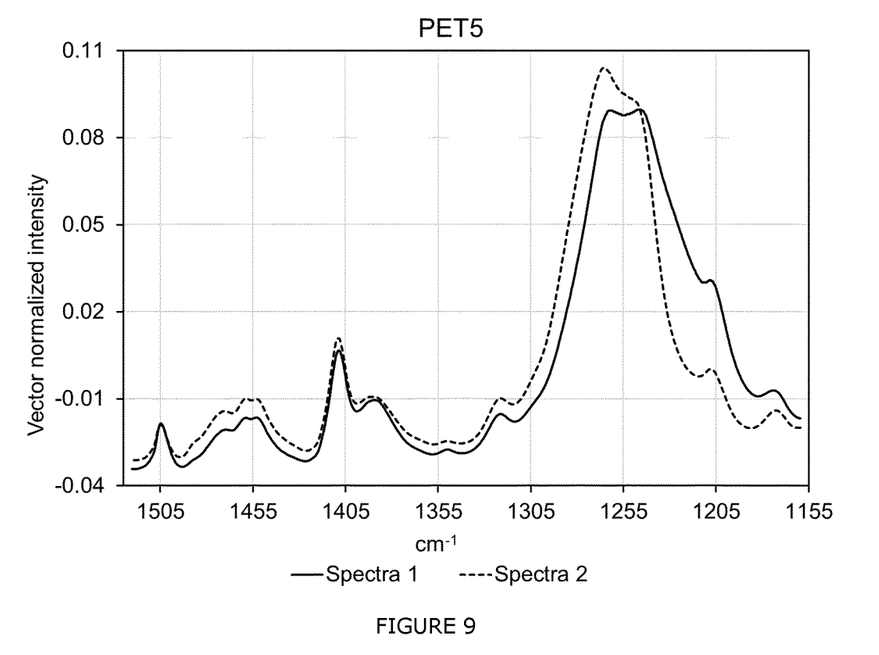
FIG. 9 Spectra with a machine direction oriented film PET5 before lamination.
Figure 10:
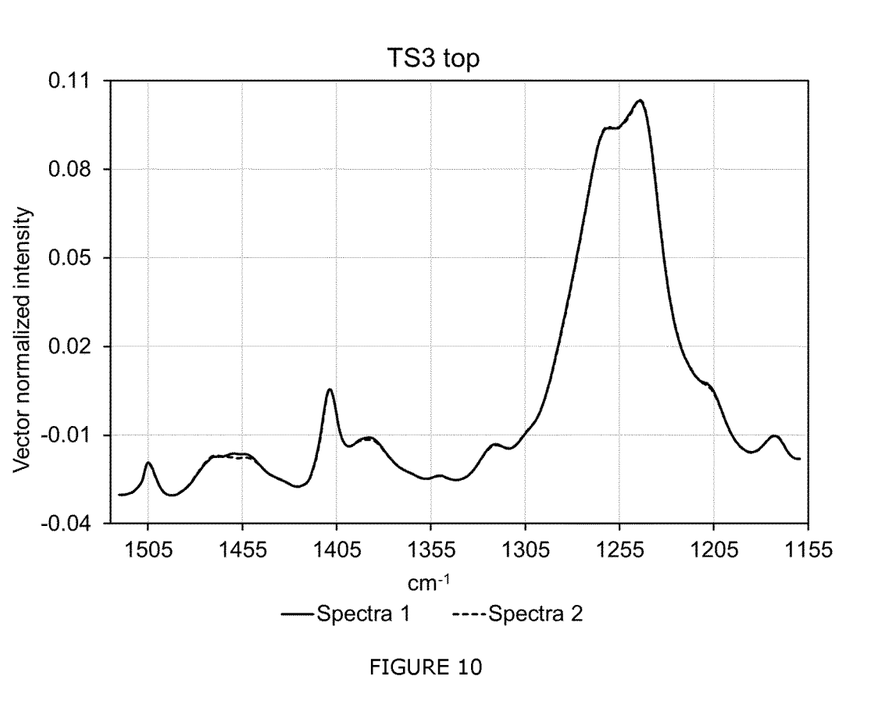
FIG. 10 Spectra with a good sample for TS3—top.

The following formula to calculate D was used:

$$D = \sqrt{\left(\sum_{k}(a(k) - b(k))^2\right)}$$

where a(k) and b(k) are the ordinate values of the a and b spectra. The sum incorporates all selected k data points. FIG. 2 shows a schematic example of two curves. The spectral distance D is proportional to the grey area between the two sine curves.

Before the spectral distance D can be determined the data must be pre-processed. By doing so, the values for D lie between 0 (equal spectra) and 2 (maximum inequality between spectra). This pre-processing is a normalisation process which first calculates the average y value of spectra and only uses data points within the selected spectral ranges. The average value calculated will then be subtracted from the spectrum, which causes the spectrum to be centred around y=0. This is followed by calculating the sum of squares of all y values, and the respective spectrum is divided by the square root of this sum. The vector norm of the result spectrum is 1.

$$a_m = \frac{\sum_k a(k)}{N}$$

$$a'(k) = a(k) - a_m$$

$$a''(k) = \frac{a'(k)}{\sqrt{\sum_k a'(k)^2}}$$

$$\sum_k a''(k)^2 = 1$$

If normalized spectra are represented in n dimensional space and n being the number of selected data points, all spectra are on the unit sphere (n dimensional sphere around the coordinate origin with radius 1). The maximum distance between two spectra is the diameter of the unit sphere, i.e. (D=) 2. The minimum distance if all points of the two spectra are overlapping on the unit sphere, i.e. D=0.

The thermal properties ($T_g$, $T_m$, orientation-induced bulk crystallinity) of the polymer films were determined by DSC. The spectra were recorded using a Mettler Toledo DSC821e instrument operated at 10° C./min heating rate. For DSC, it was necessary to analyse the free-standing films obtained from the laminated metal sheet. Free-standing polymer films were obtained by placing a sample of metal-laminate from the line in 18% hydrochloric acid in water to dissolve the metal substrate. After dissolution of the metal substrate, the polymer films were thoroughly rinsed and dried. The crystalline fraction was determined from the heat of recrystallization and the heat melting recorded during the first heating run as described in detail elsewhere. Orientation-induced crystallinity values were calculated from ratio:

$$X = \frac{|\Delta H_m| - |-\Delta H_r|}{\Delta H_0} \times 100\%$$

where $\Delta H_r$ is the observed area of recrystallization peak and $\Delta H_m$ is the observed area of melting peak, and $AH_0$ is an enthalpy of fusion for 100% crystalline PET assumed to be 115.0 J/g (J. Brandrup, E. H. Immergut, E. A. Gruike et al, Polymer Handbook, Wiley Interscience, 4th ed (1999), Section VI, Table 7) and $AH_0$ for the crystalline PBT assumed to be the same as for crystalline PET. Sufficiently re-melted PET and PBT non-oriented polymer in laminated metal sheet has a crystallinity value which is lower than 10%.

The mechanical properties of the polymer film after metal removal were determined using the Shimadzu EZ-LX tensile tester having a single column main unit with 920 mm stroke length, pneumatic action grips and a 500 N load cell. The tensile testing was performed according to ISO 527. For this test, 15 mm wide and 150 mm long strips were cut from the free-standing polymer films. For measuring tensile properties in the machine direction of the films a single test speed of 50 mm/min from the start to the end of the test (film break) was applied. In case of measuring tensile properties in the transverse direction of the films a dual speed regime was applied where 50 mm/min is applied from the start to 60 mm elongation after which the test speed is increased to 500 mm/min up to the breaking point. This difference in speed regimes for machine and transverse directions is because in the transverse direction the tensile strain at break and elongation can be much higher than those in the machine direction. All tests were performed ten times for each polymer film after which outstanding values were excluded to achieve maximum variation in modulus of 10%. The modulus values were then averaged. Orientation was evaluated by comparing the modulus (in MPa) in the machine and the transverse direction of the sample.

For this test, panels of 7.5×7.5 cm were cut from the flat sheet. The panels were then placed in an aqueous solution containing 12 g/l Maggi+2 g/l plasmal in a closed container and subsequently sterilised at 121° C. during 90 min (in case of samples TS1, TS2, CS1, CS2). In case of TS3, samples were sterilized in water at 121° C. during 90 min. After sterilisation and cooling of the samples, a 4×5 mm crosshatch is applied to the flat portion of the panel followed by adhesive tape according to the method as described in ISO 2409:1992, 2nd edition. After that delamination is evaluated using the Gitterschnitt scale ranging from 0 (excellent) to 5 (bad) (Table 3). All tests were performed in triplo for each side of each metal-laminate variant from Table 2. The score was then averaged over the three results and rounded to the nearest whole number.

TABLE 3

Classification of Gitterschnitt results

| Score | area affected | Description |
| --- | --- | --- |
| 0 | 0% | The edges of the cuts are completely smooth; none of the squares of the lattice is detached |
| 1 | <5% | Detachment of small flakes of the coating at the intersections of the cuts. |
| 2 | <15% | The coating has flaked along the edges and/or at the intersections of the cuts. |
| 3 | <35% | The coating has flaked along the edges of the cuts party or wholly in large ribbons, and/or it has flaked party or wholly on different parts of the squares. |
| 4 | <65% | The coating has flaked along the edges of the cuts in large ribbons and/or some squares have detached party or wholly. |
| 5 | — | Any degree of flaking that cannot be classified by Rank 4 |

All characterisation data for test and comparative samples are summarised in Table 4. The characterisation data on free standing films and adhesion and sterilisation data on metal-laminate samples are then compared with spectral distance values D derived by comparing ATR-FTIR Spectra 1 and Spectra 2 of corresponding metal-laminates or PET5.

As can be seen in Table 4, post-heating a metal-laminate TS1 at T2=260° C., TS2 at T2=270° C. and TS3 at T2=275° C. results in fully non-oriented isotropic polymer coatings in which uniaxial orientation in machine direction as well as residual orientation (present in PET1, PET3, PET4 and PET5 before lamination) are removed. In case of PET-based coatings, the coatings are also additionally fully amorphous as evidenced by the low crystallinity values derived by DSC (in all cases below 10%). The non-oriented isotropic nature of those polymer films is evidenced by measuring their mechanical properties. In particular, the free polymer films obtained from top sides of TS1 and TS3, and both sides of TS2, show similar modulus values in machine and transverse direction. The performance of sides coated with PET1, PET3 and PET4 during the adhesion and sterilisation test (Gitterschnitt) is excellent (less than 5% cross-cut area affected). The Gitterschnitt test data is consistent with fully re-melted isotropic and amorphous PET coating confirmed by DSC and mechanical properties of free coating films. The samples TS1 through TS3 are therefore classified as good quality samples.

In contrast, post-heating a metal-laminate CS1 at T2=200° C. and switching off post-heating in case of production of metal-laminate CS2 results in not fully re-melted semi-crystalline polymer coatings in which uniaxial orientation in machine direction (present in PET1, PET3 and PET4 before lamination) is preserved. Attempted lamination of PET5 at post-heat temperature lower than 275° C. to produce CS3 resulted in full delamination of the PET5 laminate layer during processing. High crystallinity of comparative not fully re-melted samples is evidenced by the high crystallinity values derived by DSC (in all cases above 30%). Presence of preferred orientation in those polymer coating films is evidenced by measuring their mechanical properties. In particular, modulus values measured on the polymer coating from CS1 and CS2 or PET5 film before lamination, in machine direction are 2 (top sides in CS1 and CS2), 2.6 (bottom side in CS2) and 1.4 (PET5) higher compared to those in transverse direction. The performance of films from CS1 (top side) and CS2 (top and bottom sides) coated with PET1, PET3 and PET4 during the adhesion and sterilisation test is poor with 5-15% (TS1 top side) and 65-100% (TS2) cross-cut area is affected. The Gitterschnitt test data on metal-laminate samples CS1 and CS2 are consistent with the development of crystallinity and residual orientation in the polyester coatings for these samples described above. The CS1 and CS2 samples are therefore classified as bad quality samples.

For comparative samples TS1 (top side), TS2 (top and bottom sides), CS1 (top side) and CS2 (top and bottom sides) the data on DSC and mechanical strength on free polymer coating films as well as adhesion and sterilisation data on metal-laminate were compared with corresponding spectral distance values D. Values for D were derived by comparing ATR-FTIR Spectra 1 and Spectra 2 in the 1160-1520 $cm^{-1}$ spectral region recorded directly on metal-laminate samples or on PET5 before lamination. As seen in Table 4, the D values of fully re-melted isotropic comparative samples TS1 (top side) (0.016), TS2 (top side) (0.046), TS2 (bottom side) (0.006) and TS3 (top side) (0.010) are close to 0 and correspond to well post-heated isotropic non-oriented coatings according to ATR-FTIR measurement. In contrast, D values of machine direction oriented PET5 film (0.424), not fully re-melted test samples CS1 (top side) (0.482), CS2 (top side) (0.480) and CS2 (bottom side) (0.482) are much higher than 0 and correspond to oriented coatings having preferred orientation in one direction in line with data of DSC and mechanical properties studies for those samples. As a threshold value the threshold value of 0.10 for D can be used to distinguish between bad and good quality samples.

BRIEF DESCRIPTION OF THE DRAWINGS

The invention will now be explained by means of the following, non-limiting figures.

The laminate layers are laminated to the metal strip by a process schematically shown in FIG. 1. The metal strip (1) is passed through first heating device (2) where temperature of the metal strip is raised to pre-heat temperature suitable for lamination, T1. In the present examples T1 was chosen to be 200° C. for lamination of pure PET films, 220° C. for lamination of films containing 25% PBT and 225° C. for lamination of film based on pure PBT. A coil of film PET1, PET3 or PET5 (3*a*) and PET2, PET4 or PET6 (3*b*) are simultaneously unwound and passed, together with the pre-heated metal strip, through a pair of laminating rollers (4*a*, 4*b*). The laminated metal sheet (5) is passed through a second heating device (6) where the temperature of the laminated metal sheet is raised to a post-heat set-point, T2. After the second heating device, the laminated metal sheet is immediately cooled by passing through a quenching device (7) to reach room temperature. The method of pre-heating the metal strip in the first heating device is not particularly limited and may include passing the strip over heated rolls, conductive heating, inductive heating, radiative heating, etc. The method of post-heating the laminated metal sheet in the second heating device is preferably a contactless method, such as heating in a hot gas environment or inductive heating. The method of immediate cooling in the quenching device is not particularly limited and may include applying cold air or passing through a cold-water bath etc.

The spectral distance D is proportional to the area between two curves. In FIG. 2 two model sine curves are depicted. The spectral distance is proportional to the grey area between the two sine curves.

Figure 11:
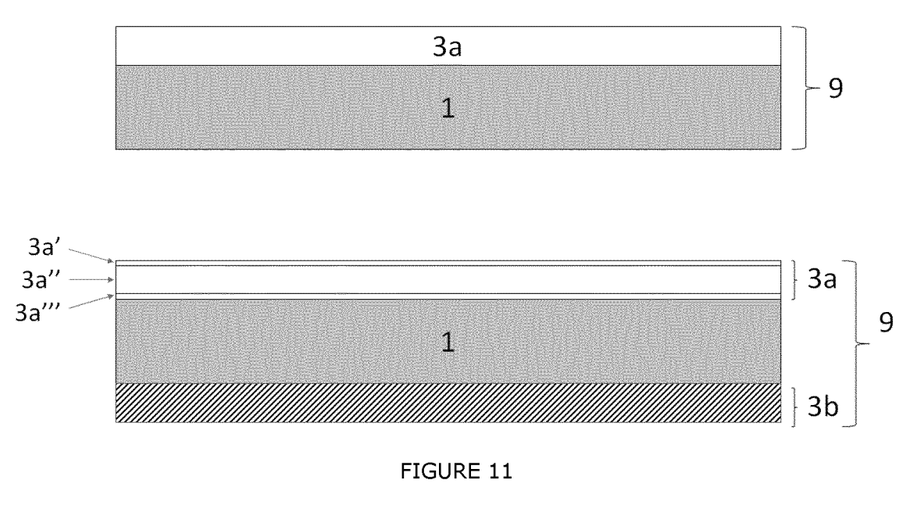
FIG. 11 Build-up of the laminated metal sheet.

FIG. 11 shows the schematic build-up of a laminated metal sheet. The top drawing shows the simplest form of laminated metal sheet 9 with the metal sheet 1 provided with one laminate layer 3*a*. The bottom figure shows a more complicated embodiment according to the invention where the metal sheet 1 is provided with a multilayer laminate layer 3*a* on top, wherein the multilayer (in this example) comprises three separate layers 3*a*', 3*a*" and 3*a*"', for instance serving as a top layer, bulk layer and adhesion layer respectively, each potentially having a different composition tailored to the requirements posed to the individual separate layer, and a second laminate layer on the bottom of the metal sheet, which may be the same in terms of composition, build-up or thickness to the laminate layer on the top in case of a symmetrical laminated metal sheet, or different in case of an asymmetrical laminated metal sheet.

Figure 12:
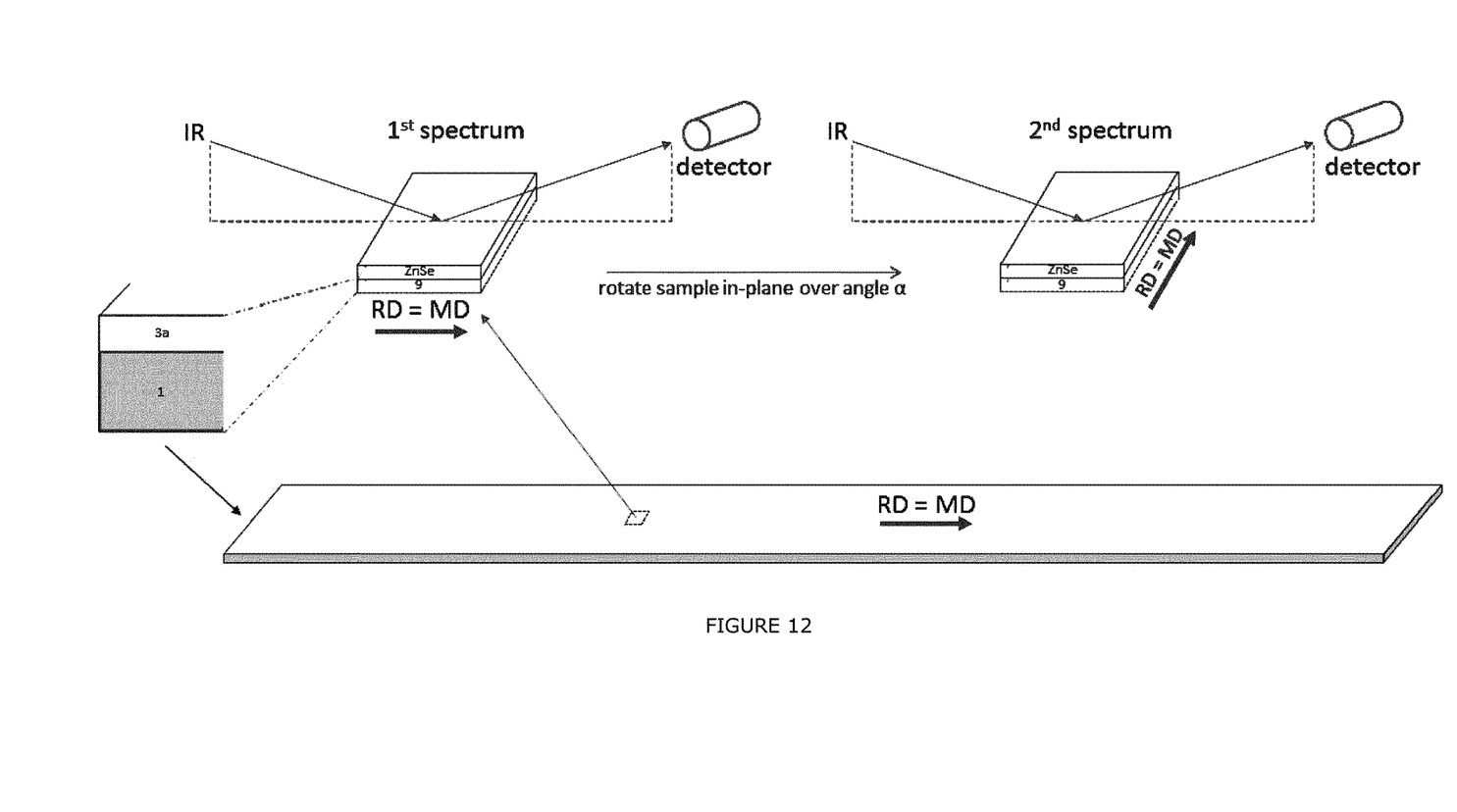
FIG. 12 Schematic interpretation of the method according to the invention.

FIG. 12 shows a schematic interpretation of the preparation of a sample taken from a laminated metal sheet and the subsequent measurements in the ATR-FTIR spectrometer. The first spectrum is measured with the direction of the incident IR-beam parallel to the machine direction (MD), which is the same as the rolling direction (RD), and the second spectrum is measured with the direction of the incident IR-beam more or less perpendicular (angle of rotation a) to the machine direction. The Euclidean distance matrix D is determined between these two spectra, and after post heating and cooling the value of D according to the invention is at most 0.10.

TABLE 4

Characterisation data of comparative (CS) and inventive (TS) laminated metal sheet samples.

| Sample → | TS1 | CS1 | TS2 | | CS2 | | TS3 | PET5 (before lamination) |
|---|---|---|---|---|---|---|---|---|
| Side → | Top | Top | Top | Bottom | Top | Bottom | Top | |
| Film → | PET1 | PET1 | PET3 | PET4 | PET3 | PET4 | PET5 | |
| T1 (° C.) | 200 | 200 | 220 | | 220 | | 225 | n.d. |
| T2 (° C.) | 260 | 200 | 270 | | No post-heat | | 275 | n.d. |
| X (%) | 5.4 | 36.2 | 8 | 2.6 | 32.6 | 37.1 | 37 | 38 |
| Modulus MD (Mpa) | 2830 | 8188 | 2823 | 3101 | 8392 | 9875 | 2756 | 3912 |
| Modulus TD (Mpa) | 3006 | 4097 | 2814 | 3012 | 3745 | 3787 | 2391 | 2680 |
| Gitterschnitt (Bouillon Plasmal) | 1 0 1 | 1 2 2 | 0 0 0 | 0 0 0 | 4 4 4 | 5 5 5 | 0 0 1 | n.d. |

TABLE 4-continued

Characterisation data of comparative (CS) and inventive (TS) laminated metal sheet samples.

| Sample → | TS1 | CS1 | TS2 | CS2 | TS3 | PET5 (before lamination) |
|---|---|---|---|---|---|---|
| D | 0.016 | 0.482 | 0.046  0.006 | 0.480  0.482 | 0.010 | 0.416 |
| Sample quality | Good | Bad | Good | Bad | Good | Bad |

The invention claimed is:

1. A method for producing a laminated metal sheet in a continuous laminating line operated at a line speed v, the laminated metal sheet comprising a thermoplastic polymer laminate layer comprising thermoplastic polymer,
the method comprising the subsequent steps of:
providing a metal sheet;
providing the thermoplastic polymer laminate layer for laminating onto at least one side of the metal sheet with a value for the Euclidean distance matrix D between a first and a second ATR FTIR spectrum of the laminate layer of 0.20 or higher, wherein the first spectrum is measured in an ATR-FTIR spectrometer with a first incident IR-beam parallel or perpendicular to the machine direction of the laminated metal sheet and wherein the second spectrum is measured in the ATR-FTIR spectrometer with a second incident IR-beam after rotating the laminated metal sheet over an angle alpha in the plane of the laminate layer selected between 7° and 110°, and wherein the ATR-FTIR spectra are measured in the spectral range which includes the range of 1160 to 1520 $cm^{-1}$,
wherein the thermoplastic polymer laminate layer is a solid thermoplastic polymer film of:
(I) a single thermoplastic polymer layer composed of at least 80% by mass of at least one polyester selected from the group consisting of:
(a) polyethylene terephthalate polyester;
(b) PETg, wherein PETg is polyethylene terephthalate (PET)-based (co)polyester modified with 1,4-Cyclo-hexanedimethanol (CHDM);
(c) polyethylene terephthalate (PET)-based (co)polyester modified with isophthalic acid (IPA); and
(d) polybutylene terephthalate (PBT) polyester; or
(II) a plurality of thermoplastic polymer layers each composed of at least 80% by mass of at least one polyester selected from the group consisting of:
(a) polyethylene terephthalate polyester;
(b) $PET_g$, wherein PETg is polyethylene terephthalate (PET)-based (co)polyester modified with 1,4-Cyclo-hexanedimethanol (CHDM);
(c) polyethylene terephthalate (PET)-based (co)polyester modified with isophthalic acid (IPA); and
(d) polybutylene terephthalate (PBT) polyester;
wherein the polyesters (a)-(d) are selected from the group consisting of: polyester that contains at least 70% by mole of an ethylene terephthalate unit; polyester that contains at least 85% by mole of a butylene terephthalate unit, and polyester that contains at least 85% by mole of an blend of a polyester containing 85% by mole of an ethylene terephthalate unit and a polyester containing at least 85% by mole of a butylene terephthalate unit;
wherein the solid thermoplastic polymer film is a uniaxially oriented thermoplastic polymer film;
wherein polymer of the thermoplastic polymer film consists of thermoplastic polymer;
laminating the laminate layer onto the metal sheet to produce a laminated metal sheet;
post-heating the laminated metal sheet to a post-heat set-point T2 sufficiently high to melt the thermoplastic polymer of the laminate layer;
cooling the post-heated laminated metal sheet to produce a laminated metal sheet with an Euclidean distance matrix D between a first and a second ATR FTIR spectrum of the laminate layer having a value in the range of 0.10 or lower, wherein the first spectrum is measured in an ATR-FTIR spectrometer with the first incident IR-beam parallel or perpendicular to the machine direction of the laminated metal sheet and wherein the second spectrum is measured in the spectrometer after rotating the laminated metal sheet over the angle alpha in the plane of the laminate layer selected between 7° and 110°, and wherein the ATR-FTIR spectra are measured in the spectral range which includes the range of 1160 to 1520 $cm^{-1}$;
wherein when measuring the first ATR FTIR spectra for the thermoplastic polymer laminate layer for coating onto at least one side of the metal sheet and when measuring the first ATR FTIR spectra for the laminate layer on the post-heated laminated metal sheet the first and second incident beams are parallel to the machine direction of the laminated metal sheet or the first and second incident beams are perpendicular to the machine direction of the laminated metal sheet;
wherein the angle alpha for rotating the thermoplastic polymer laminate layer for laminating onto at least one side of the metal sheet and the angle alpha for rotating the laminate layer on the post-heated laminated metal sheet are the same.

2. The method according to claim 1, wherein the thermoplastic polymer laminate layer for coating onto the metal sheet is the thermoplastic polymer film of one or more thermoplastic polymer layers and is made by:
melting thermoplastic polymer granules in one or more extruders to make molten polymer or polymers to form the one or more thermoplastic polymer layers;
forming the thermoplastic polymer film of the one or more thermoplastic polymer layers by passing the molten polymer or polymers through a flat (co-) extrusion die and/or two or more calendering rolls;
optionally followed by:
cooling the thermoplastic polymer film to form the solid thermoplastic polymer film;
optionally trimming the edges of the thermoplastic polymer film;
reducing the thickness of the solid thermoplastic polymer film by stretching the solid polymer film in a stretching unit by exerting a stretching force only in the longitudinal direction; optionally trimming the edges of the stretched thermoplastic polymer film.

3. The method according to claim 1, wherein the post-heat set-point (T2) or the line speed (v) of the continuous coating line or both the heat set-point and the line speed is or are adjusted if the Euclidean distance matrix D of the laminate layer after post-heating and cooling has a value of above 0.10.

4. The method according to claim 1, wherein the angle alpha is selected between 8° and 100°.

5. The method according to claim 4, wherein the angle alpha is about 90°.

6. The method according to claim 1, wherein the metal sheet is a steel.

7. The method according to claim 6, wherein the steel is uncoated cold-rolled steel, tinplate, Electrolytically Chromium Coated Steel (ECCS), Trivalent Chromium-Coated Steel, galvanised steel or aluminised steel.

8. The method according to claim 1, wherein the thermoplastic polymer laminate layer is the solid thermoplastic polymer film of:
(I) said single thermoplastic polymer layer composed of at least 90% by mass of said at least one polyester; or
(II) said plurality of thermoplastic polymer layers each composed of at least 90% by mass of said at least one polyester.

9. The method according to claim 1, wherein the thermoplastic polymer laminate layer is the thermoplastic polymer film of:
(I) said single thermoplastic polymer layer composed of at least 95% by mass of said at least one polyester; or
(II) said plurality of thermoplastic polymer layers each composed of at least 95% by mass of said at least one polyester.

10. The method according to claim 1, wherein polymer of the thermoplastic polymer film consists of polyester polymer.

11. The method according to claim 1, wherein the thermoplastic polymer laminate layer is laminated onto the metal sheet to produce a laminated metal sheet without interruption in a continuous process.

12. The method according to claim 1, wherein the thermoplastic polymer laminate layer is applied at least to the side of the metal sheet that becomes the inside of a packaging and the polyester in the thermoplastic polymer laminate layer contains at least 70% by mole of an ethylene terephthalate unit.

13. The method according to claim 1, wherein the thermoplastic polymer laminate layer is applied at least to the side of the metal sheet that becomes the inside of a packaging and the polyester in the thermoplastic polymer laminate layer contains at least 85% by mole of a butylene terephthalate unit.

14. The method according to claim 1, wherein the thermoplastic polymer laminate layer is applied at least to the side of the metal sheet that becomes the inside of a packaging and the polyester in the laminate layer contains a blend of a polyethylene terephthalate and polybutylene terephthalate, wherein the ratio of PET to PBT is 60:40 or higher.

15. The method according to claim 1, wherein the thermoplastic polymer laminate layer is applied at least to the side of the metal sheet that becomes the inside of a packaging and the polyester in the thermoplastic polymer laminate layer contains at least 85% by mole of an blend of a polyester containing 85% by mole of an ethylene terephthalate unit and a polyester containing at least 85% by mole of a butylene terephthalate unit.

16. The method according to claim 1,
wherein the thermoplastic polymer laminate layer comprises at least 90% by mass at least one polyester selected from the group consisting of:
(a) polyethylene terephthalate polyester,
(c) polyethylene terephthalate based polyester modified with isophthalic acid, and
(d) polybutylene terephthalate polyester.

17. A laminated metal sheet for packaging applications obtainable or obtained by the method according to claim 1, the laminated metal sheet comprising a metal sheet and the thermoplastic polymer laminate layer that covers at least one side of the metal sheet,
wherein the thermoplastic polymer laminate layer contains (I) the single layer or (II) the plurality of layers,
wherein the thermoplastic polymer laminate layer after lamination onto the metal sheet has a value of D between the first and the second ATR-FTIR spectrum of the thermoplastic polymer laminate layer of at most 0.10, and wherein the first spectrum is measured in an ATR-FTIR spectrometer with the incident IR-beam parallel or perpendicular to the machine direction of the laminated metal sheet and wherein the second spectrum is measured in the spectrometer after rotating the laminated metal sheet over the angle alpha in the plane of the thermoplastic polymer laminate layer selected between 7° and 110°, and wherein the ATR-FTIR spectra are measured in the spectral range which includes the range of 1160 to 1520 $cm^{-1}$.

18. The method according to claim 1,
wherein the thermoplastic polymer laminate layer is applied at least to the side of the metal sheet that becomes the inside of a packaging,
wherein the angle alpha is selected between 8° and 100°.

19. The method according to claim 18, wherein the angle alpha is about 90°.

20. The method according to claim 1, wherein the angle alpha is about 90°,
wherein the thermoplastic polymer laminate layer comprises at least 90% by mass at least one polyester selected from the group consisting of:
(a) polyethylene terephthalate polyester,
(c) polyethylene terephthalate based polyester modified with isophthalic acid, and
(d) polybutylene terephthalate polyester.

* * * * *